UNITED STATES PATENT OFFICE.

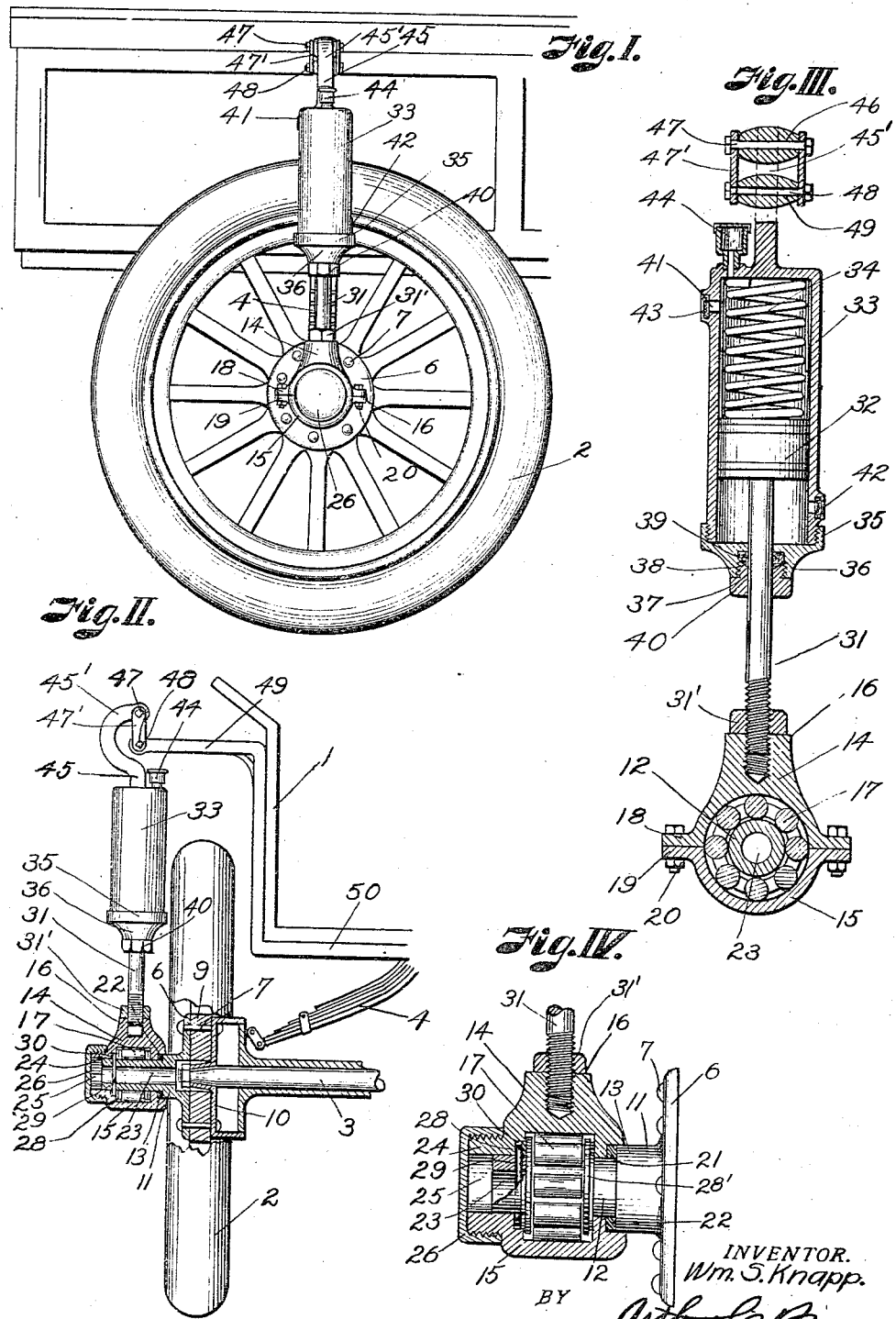
W. S. KNAPP.
VEHICLE SPRING.
APPLICATION FILED OCT. 23, 1916.
1,265,677.
Patented May 7, 1918.
INVENTOR.
Wm. S. Knapp.
BY Arthur C. Brown
ATTORNEY.

WILLIAM S. KNAPP, OF KANSAS CITY, MISSOURI.

VEHICLE-SPRING.

1,265,677.    Specification of Letters Patent.    Patented May 7, 1918.

Application filed October 23, 1916. Serial No. 127,108.

*To all whom it may concern:*

Be it known that I, WILLIAM S. KNAPP, a citizen of the United States, residing at Kansas City, in the county of Jackson and State of Missouri, have invented certain new and useful Improvements in Vehicle-Springs; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to vehicle springs and more particularly to a combined pneumatic and spring device of this character for use on automobile trucks, or the like, the principal object of the invention being to provide means whereby the weight of a load carried by a vehicle may be divided and placed on each side of the carrying wheels.

A further object of the invention is to so construct the device that it may be applied readily to automobiles or trucks of an ordinary type, and which wil labsorb the jar and jolt incident to ordinary travel.

In accomplishing these objects I have provided improved details of structure the preferred forms of which are illustrated in the accompanying drawings, wherein:—

Figure I is a side elevation of a part of a vehicle body and a supporting wheel showing the application of my spring device thereto.

Fig. II is an end view of the same, parts being shown in section for better illustration.

Fig. III is an enlarged vertical section through the spring device.

Fig. IV is an enlarged section of the bearing parts.

Referring more in detail to the drawings:—

1 designates the body of an automobile, or truck of any ordinary construction, having ground wheels 2, a driving or supporting axle 3 and springs 4 mounted on the axle to resiliently support the body 1.

As automobiles are now constructed, in most cases the body load is carried by springs mounted on the axles between the carrying wheels, and as the weight is applied to the axle only at one side of the wheels, there is a resultant tendency to bend the axle downwardly at the center and to draw the wheels inwardly at the top, thereby causing an undue strain on the axle and binding of the driving parts which consequently reduces the efficiency of the vehicle.

In order to eliminate the binding tendency of the axle, I provide for distributing the load by extending the axle in such a manner that equal portions of the load may be carried at each side of the wheel, so that the carrying capacity of the vehicle in weight may be greatly increased without danger to the axles and without straining or binding the driving parts.

Mounted on the outer face of the wheel 2 is a hub plate 6, which is fastened to the wheel by bolts 7 that extend through the plate about its periphery and through the spoke heads 9 and are anchored in a hub plate 10 on the inner face of the wheel.

The plate 6 is placed concentric with the vehicle wheel and is provided at its center with a hub 11, which is turned down to form an axle 12, having its axis concentric with the axis of the axle 3 and provided, near its base, with a shoulder 13.

Mounted on the axle 12 are upper and lower sections 14—15 of a boxing 16, containing roller bearings 17 within which the axle 12 is revoluble, the sides of the sections 14—15 being provided with flanges 18—19 for receiving bolts 20, whereby the sections are bolted tightly together about the axle. The boxing is also provided, at its inner face with a socket 21 for seating over the hub 11 and for receiving a packing washer 22 that prevents dust from working into the bearing.

For lubricating purposes the axle 11 is also provided with a central bore 23 and the boxing 16 is provided with an extended neck 24, forming an interior cup 25 wherein a lubricant may be placed and confined by a cap 26 which threads over the neck 24.

In order to prevent the boxing 15 from slipping from the axle, the roller bearings 16 are confined in a cage, comprising the side rings 28—28′, and projected through the axle and extending into the boxing at opposite sides thereof is a pin 29, the ends of which bear against the outer bearing cage ring 28 to prevent the bearings from moving outward on the axle. The projecting ends of the pin 29 also seat in a socket 30 within the boxing 16 and the pin is prevented thereby from being displaced from its mounting.

Mounted on the boxing section 14, preferably by threading the same therein, is a rod 31, provided at its lower end with a lock nut 31' and at its upper end a piston 32 that is slidably contained in a cylinder 33 and bears upwardly against the pressure of a coil spring 34, which seats against the piston and against the upper end of the cylinder.

The cylinder 33 is preferably provided at its lower end with a cap 35 which is threaded thereon and which has a downwardly extended neck 36, having a central opening 37 for receiving the piston rod, and having an internally threaded socket 38 for receiving packing 39 and a nut 40, whereby the packing may be held tightly about the rod.

Also opening into the cylinder, at its upper and lower ends, are ports 41—42, having screened coverings 43 through which air may be admitted or exhausted from the cylinder as the piston oscillates therein, and mounted on the cylinder is an oil cup 44 which opens into the cylinder and provides means for lubricating the piston.

Extending upwardly from the cylinder is an arm 45 having a hook shaped upper end 45' provided with an end aperture 46 for receiving a pin 47 on which links 47' are pivotally suspended, and which are connected by a pin 48 with the supporting arm 49 mounted on the body.

Assuming that the parts are so constructed and the axle plates 6 bolted on the outer faces of the wheel 2, so that the axle members 12 and 3 are in alinement, roller bearings are placed on the axle extensions and the locking pins inserted. The boxing parts are then applied to the axle and bolted together, the piston rod 31 threaded into the upper boxing part a distance sufficient to equally distribute the load at opposite sides of the wheels and the cylinder arm 45' attached through the links 47' to the body supporting arms 50.

If it should be desired to remove the wheel or tire for repair or other purposes, the rod 31 is threaded downwardly into its socket, so that the weight on the piston will be relieved. The connecting links 47' may then be unbolted and removed from the arm 49 and the cylinder and piston swing downwardly to permit the tire to be removed from the wheel.

Having thus described my invention what I claim as new therein and desire to secure by Letters-Patent, is:—

1. The combination with a vehicle body, a supporting axle and ground wheel, of an axle extension comprising a flanged plate secured to the exterior of said wheel and having an axle extended therefrom concentric with the body supporting axle, a boxing mounted on said axle extension, a standard threaded into said boxing and adapted for vertical adjustment thereon, a nut on said standard for locking the standard at an adjusted position, a cushioning device mounted on said standard, a standard mounted on the cushioning device, and means for pivotally suspending the vehicle body from the last named standard.

2. The combination with a vehicle body having a supporting axle, ground wheels and body supporting devices mounted on said axle between said wheels, of axle extensions mounted on the exterior of said wheels, cushions mounted on said axle extensions, each comprising a boxing for revolubly receiving said axle extension, a cylinder, a piston slidable in said cylinder, a rod mounted in said boxing and connecting with said piston, a coil spring contained within said cylinder between said piston and the upper end of the cylinder, a standard on said cylinder, and means for suspending the vehicle body from said standard, for the purpose set forth.

3. The combination with a vehicle body having ground wheels, an axle, and body supporting devices mounted on said axle exteriorly of and adjacent the wheels, axle extensions mounted on the exterior of said wheels, cushions mounted on said axle extensions, each comprising a boxing having anti-friction members for revolubly containing said axle extension, a cylinder having air ports at opposite ends, a piston slidable in said cylinder, a piston rod mounted on said boxing, a compression spring in said cylinder adapted for bearing against the upper end of said cylinder and said piston, a standard on said cylinder, and means for suspending said vehicle body from said standard.

In testimony whereof I affix my signature.

WILLIAM S. KNAPP.